2 Sheets—Sheet 1.
J. WHITE.
SHEET METAL TILE.
No. 11,294. Reissued Dec. 13, 1892.
Fig. 3.
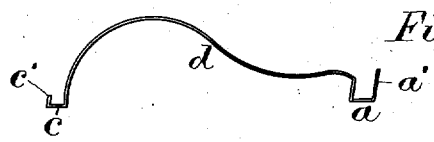
Fig. 4.
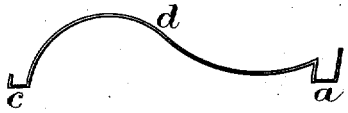
Fig. 1.
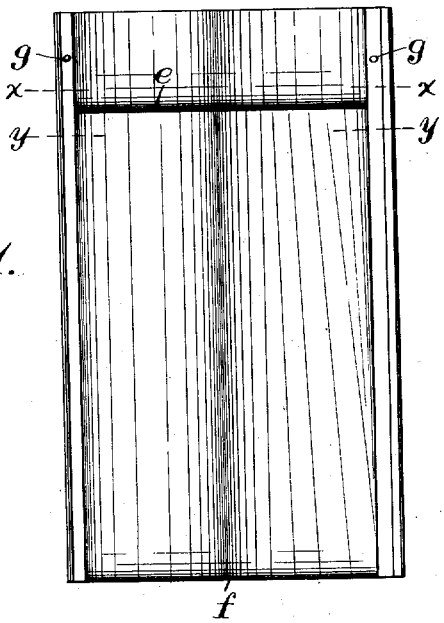
Fig. 2.
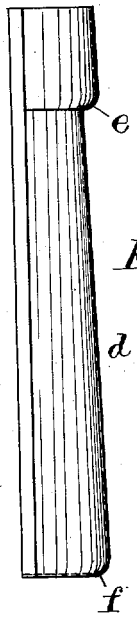
Fig. 5.
Fig. 6.
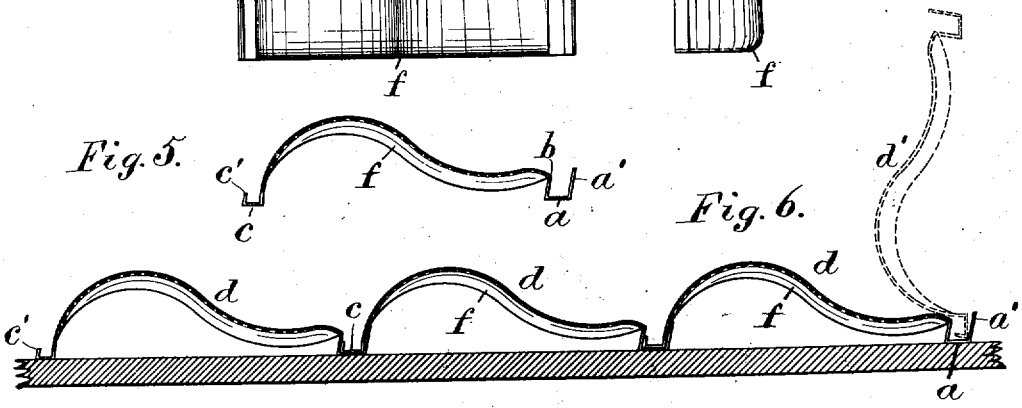
Attest:
L. Lee.
Edw. F. Kinsey
Inventor.
James White, per
Crane & Weller, attys.

2 Sheets—Sheet 2.

J. WHITE.

SHEET METAL TILE.

No. 11,294. Reissued Dec. 13, 1892.

Attest:
L. Lee,
Edw. F. Kinsey

Inventor,
James White, per
Crane & Miller, attys.

UNITED STATES PATENT OFFICE.

JAMES WHITE, OF BROOKLYN, NEW YORK.

SHEET-METAL TILE.

SPECIFICATION forming part of Reissued Letters Patent No. 11,294, dated December 13, 1892.

Original No. 471,450, dated March 22, 1892. Application for reissue filed October 25, 1892. Serial No. 449,998.

*To all whom it may concern:*

Be it known that I, JAMES WHITE, a citizen of the United States, residing at Brooklyn, Kings county, New York, have invented certain new and useful Improvements in Sheet-Metal Tiles, fully described and represented in the following specification and the accompanying drawings, forming a part of the same.

The object of this invention is to furnish in sheet metal an immitation of the thick earthen tiles of ogee cross-section, which are frequently used as a decorative covering for pitched roofs. The surfaces of such tiles are concave along one of the edges and convex along the opposite edge, so that they cannot be laid to break joints like slates, shingles, and the sheet-metal tiles heretofore used. By my construction sheet-metal tiles of such concavo-convex cross-section may be laid with the convex portions of the tiles coincident and with continuous gutters at the edges of the tiles extending from the top to the bottom of the roof.

An effectual weather-joint is provided by forming an offset transversely across the entire width of the tile near its upper end and providing a lip at the lower end of the tile. Such lips are common upon sheet-metal tiles; but an offset has never been formed across the entire width of the tile, as it would prevent the tiles from being laid to break joints. In the tile illustrated herein the edge adjacent to the concave portion of the surface is formed with a deep open gutter having an upturned flange. This flange is adapted to fit elastically inside the downwardly-curved edge of an adjacent tile next the convex portion of its surface. By slightly sloping the inner side of the gutter it is adapted to receive and interlock with a similar open gutter formed upon the edge of the adjacent tile next to its convex surface. The gutter formed upon the edge of the tile next to its concave surface operates to raise such edge of the tile above the roof when the bottom of the gutter rests thereon.

My improved construction will be understood by reference to the annexed drawings, in which—

Figure 7:
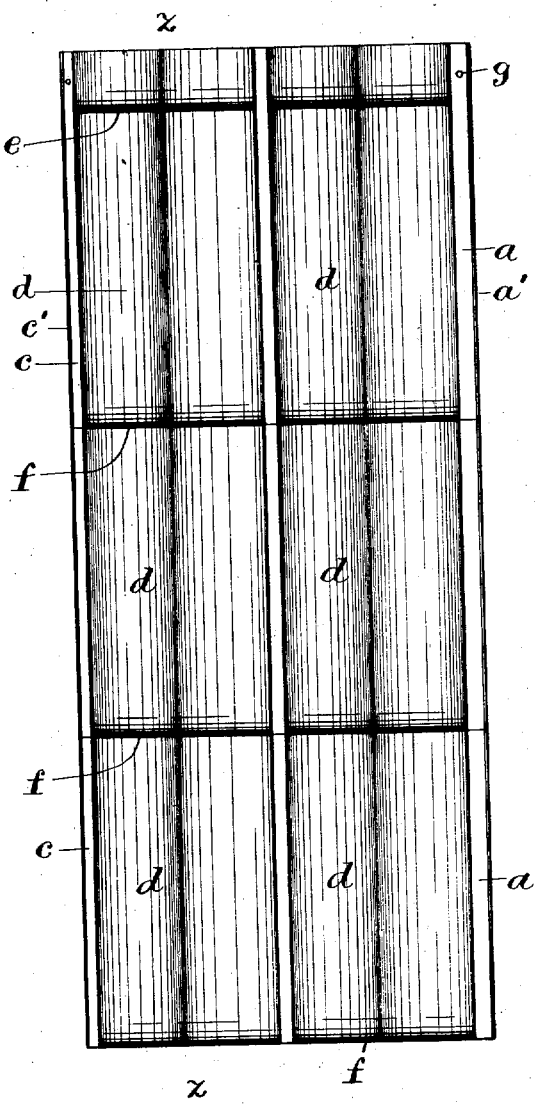
Figure 8:
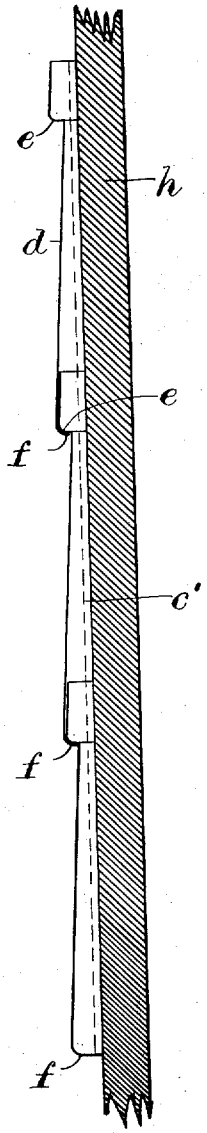

Figure 1 is a plan and Fig. 2 an edge view of one tile. Fig. 3 is a cross-section of the tile at the offset near the upper end on line $x\ x$ in Fig. 1. Fig. 4 is a transverse section below such offset line $y\ y$ in Fig. 1. Fig. 5 shows the lower end of the tile. Fig. 6 shows the lower ends of three tiles interlocked in contact with the roof-boards and a fourth tile in dotted lines in position for locking with the others. Fig. 7 is a plan of six tiles laid upon a roof, and Fig. 8 a longitudinal section of the same on line $z\ z$ in Fig. 7.

The outline of the tile, as shown in Fig. 1, is rectangular, and the body $d$ is bent into an ogee curve transversely with the gutter $a$ of nearly-rectangular cross-section adjacent to the concave portion of the tile, which is shown at the right-hand edge of Figs. 1, 3, 4, 5, and 6. The gutter projects below the margin $b$, so as to raise the same above the roof, and is provided at its outer side with an upturned flange $a'$. The convex surface of the tile when the tile is laid upon the roof slopes toward the same at an abrupt angle, and a flange $c$ is formed upon such edge parallel with the flat bottom of the gutter and is preferably provided with an upturned edge $c'$ to fit against the inner side of the gutter adjacent to the margin $b$ of the tile. The upper portion of the tile is formed with an offset $e$, extended transversely across its entire width, by which such upper portion is raised somewhat above the body of the tile. The body from the offset to the lower end is inclined to the edges, so as to stand off from the roof about five-eighths of an inch more at the lower end than adjacent to the offset, and the lower end is formed with a lip $f$, adapted to fit or hook over the offset when the tiles are laid to form a weather-joint. The sides of the gutter are shown slightly inclined, so that the inner wall of the gutter is undercut, and the upturned edge $c'$ upon the flange $c$ is formed to fit snugly against such undercut side to hold the flange down within the gutter when the tiles are laid and to form a tight joint between the same. The edges of the tiles are interlocked in succession, as shown in the dotted tile in Fig. 6, by holding the tile at right angles to the roof, inserting the edge $c'$ into the gutter, and then turning the tile down upon the roof, which twists the edge $c'$ into close contact with the undercut side of the gutter. The outer edge of the flange $a'$ upon the gutter $a$ is extended upward from the roof beyond the adjacent margin *b* of the title and is so bent as to press elastically upon the inner side of the tile adjacent to the flange *c*, as shown in two of the tiles drawn in full lines in Fig. 6. Such elastic pressure compensates for slight variations in the shape of the flange or gutter in the process of manufacture and serves to form a snug close joint, whether a single flange *c* is fitted within the gutter, as at the lower end of each tile, or two of the flanges are fitted within the same, as necessarily occurs above the offset *e*.

Nail-holes *g* are shown in the flanges at opposite sides of the tile above the offset in Fig. 1, and the tiles are fastened to the roof by securing each row with nails through such holes and applying a row above the same, with the lips *f* fitted over the offsets *e*. With this arrangement the flange *c* upon the lower end of each tile is locked within the gutter *a*, adjacent to the nail in the upper end of the tile below it.

The fitting of the lips *f* over the offsets and the locking of the flanges within the gutters form complete weather-joints, while the locking of the flanges *c* within the gutters serves to hold the lower end of each tile rigidly down to the roof, and thus prevents displacement by wind. The roof-boards *h* may for the application of such tiles be laid at at any desired angle. The sloping of the tile-body *d* in relation to the parallel joint-flanges at its opposite edges affords the means to form the lip upon the lower end, which covers the roof with a series of offsets similar to those exhibited by the lower ends of earthen tiles.

I am aware that sheet-metal tiles have been formed to break joints like slates and shingles when laid upon roofing-boards, and that it is common in such constructions to form a lip upon the lower edge of the tile, with offsets projected at two places upon the upper end of the tile to engage with such lip and to avoid the joint at the edges of the tile. My construction is especially adapted to tiles of ogee cross-section, and is thus provided with an offset wholly different from any that can be used upon tiles with broken joints. It is also adapted to hold the convex portions in each row of tiles coincident from the top to the bottom of the roof, thus forming continuous gutters between the several rows, which cannot be effected where tiles are laid with broken joints.

In my invention the interlocked edges of the tiles are in line with one another, and thus form continuous joints adapted to produce continuous gutters between the convex portions of the adjacent rows of tiles, which gutters are not admissible with the styles of sheet-metal tiles heretofore made, and my construction provides means for forming such gutters between the rows of tiles with a tight lock-joint, so that the wind cannot displace the lower ends of the tiles, through which it would not be proper to form nail-holes.

I do not claim a sheet-metal tile having a lip at its lower end with a projection at the upper end to fit some portion of the lip; nor do I claim a lock-joint at the edges of the flanges, as such constructions have been used in other sheet-metal tiles.

What I do claim as my invention is—

1. A series of sheet-metal tiles of ogee cross-section, each tile having an offset extended across its entire width adjacent to the upper end and a lip extended transversely across its entire width at the lower end and its edges bent to interlock with those of the other tiles and the series arranged to form continuous joints between the adjacent rows of tiles, substantially as set forth.

2. A sheet-metal tile of ogee cross-section, having its upper end offset transversely across its entire width, a lip extended transversely across its entire width at the lower end, the open gutter *a* at the concave edge of the tile, and the flange *c* at the convex edge of the tile, adapted to fit within such open gutter, as and for the purpose set forth.

3. A sheet-metal tile of ogee cross-section, having its upper end offset transversely across its entire width, a lip extended transversely across its entire width at the lower end, the inclined open gutter *a*, projected below the margin of the tile at the concave edge and provided upon its outer side with the flange *a'*, adapted to fit inside the convex portion of the tile, and the flange *c*, adjacent to such convex portion and provided with the bent edge *c'*, adapted to fit within the gutter and interlock therewith, substantially as herein set forth.

In testimony whereof I have hereunto set my hand in the presence of two subscribing witnesses.

JAMES WHITE.

Witnesses:
A. O. KITTREDGE,
T. S. CRANE.